(12) United States Patent
Ko et al.

(10) Patent No.: US 11,539,871 B2
(45) Date of Patent: Dec. 27, 2022

(54) ELECTRONIC DEVICE FOR PERFORMING OBJECT DETECTION AND OPERATION METHOD THEREOF

(71) Applicant: SAMSUNG ELECTRONICS CO., LTD., Suwon-si (KR)

(72) Inventors: Sangsoo Ko, Yongin-si (KR); Kyoungyoung Kim, Suwon-si (KR); Byeoungsu Kim, Hwaseong-si (KR); Sanghyuck Ha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/169,648

(22) Filed: Feb. 8, 2021

(65) Prior Publication Data
US 2021/0377437 A1 Dec. 2, 2021

(30) Foreign Application Priority Data
May 28, 2020 (KR) .................. 10-2020-0064597

(51) Int. Cl.
*H04N 5/232* (2006.01)
*H04N 5/445* (2011.01)
*H04N 5/225* (2006.01)
*B60R 1/00* (2022.01)

(52) U.S. Cl.
CPC ........... *H04N 5/23206* (2013.01); *B60R 1/00* (2013.01); *H04N 5/2252* (2013.01); *H04N 5/44504* (2013.01); *B60R 2300/105* (2013.01); *B60R 2300/303* (2013.01)

(58) Field of Classification Search
CPC ............ H04N 5/23206; H04N 5/2252; H04N 5/44504; B60R 1/00; B60R 2300/105; B60R 2300/303
See application file for complete search history.

(56) References Cited

U.S. PATENT DOCUMENTS

| | | | |
|---|---|---|---|
| 8,928,753 B2 | 1/2015 | Han et al. | |
| 9,131,120 B2 | 9/2015 | Schofield et al. | |
| 10,313,584 B2 | 6/2019 | Pan et al. | |
| 10,377,309 B2 | 8/2019 | Lee et al. | |
| 10,733,723 B2* | 8/2020 | Diao ................ | G06V 10/50 |
| 2006/0274302 A1* | 12/2006 | Shylanski ............ | G06T 7/0006 |
| | | | 356/139.09 |

(Continued)

FOREIGN PATENT DOCUMENTS

JP 2009140305 A 6/2009
KR 100833704 5/2008

*Primary Examiner* — Zaihan Jiang
(74) *Attorney, Agent, or Firm* — Volentine, Whitt & Francos, PLLC

(57) ABSTRACT

An electronic device includes: a first image sensor that outputs a first image produced by photographing a first viewing angle; a second image sensor that outputs a second image produced by photographing a second viewing angle that overlaps a portion of the first viewing angle; a third image sensor that outputs a third image produced by photographing a third viewing angle; and a processor that performs object detection on an object included in an image. The processor generates disparity information indicating a separation degree of a feature point of the first and second images, transforms the third image based on the disparity information, and performs object detection on the transformed third image.

18 Claims, 18 Drawing Sheets

(56) References Cited

U.S. PATENT DOCUMENTS

| | | |
|---|---|---|
| 2013/0250046 A1 | 9/2013 | Schofield et al. |
| 2013/0286193 A1 | 10/2013 | Pflug |
| 2014/0218531 A1* | 8/2014 | Michiguchi ............ G06V 20/56 |
| | | 348/148 |
| 2016/0086322 A1* | 3/2016 | Arita ....................... E01B 35/06 |
| | | 382/154 |
| 2018/0031364 A1* | 2/2018 | Kallay ................... G01B 11/02 |
| 2019/0088135 A1* | 3/2019 | Do ....................... G05D 1/0088 |
| 2019/0143896 A1 | 5/2019 | Rathi et al. |
| 2019/0197667 A1* | 6/2019 | Paluri .................. G06V 10/803 |
| 2019/0213746 A1* | 7/2019 | Azuma .................... G06T 7/73 |
| 2019/0248288 A1 | 8/2019 | Oba |
| 2019/0253625 A1 | 8/2019 | Pan et al. |
| 2019/0304117 A1* | 10/2019 | Bitan ....................... G06T 7/593 |
| 2019/0362480 A1* | 11/2019 | Diao .................... G06V 10/754 |
| 2019/0362486 A1* | 11/2019 | Diao .................... G06K 9/6256 |
| 2020/0217972 A1* | 7/2020 | Kim ....................... G01C 21/30 |
| 2020/0262344 A1* | 8/2020 | Ihlenburg ................ H04N 7/18 |

\* cited by examiner

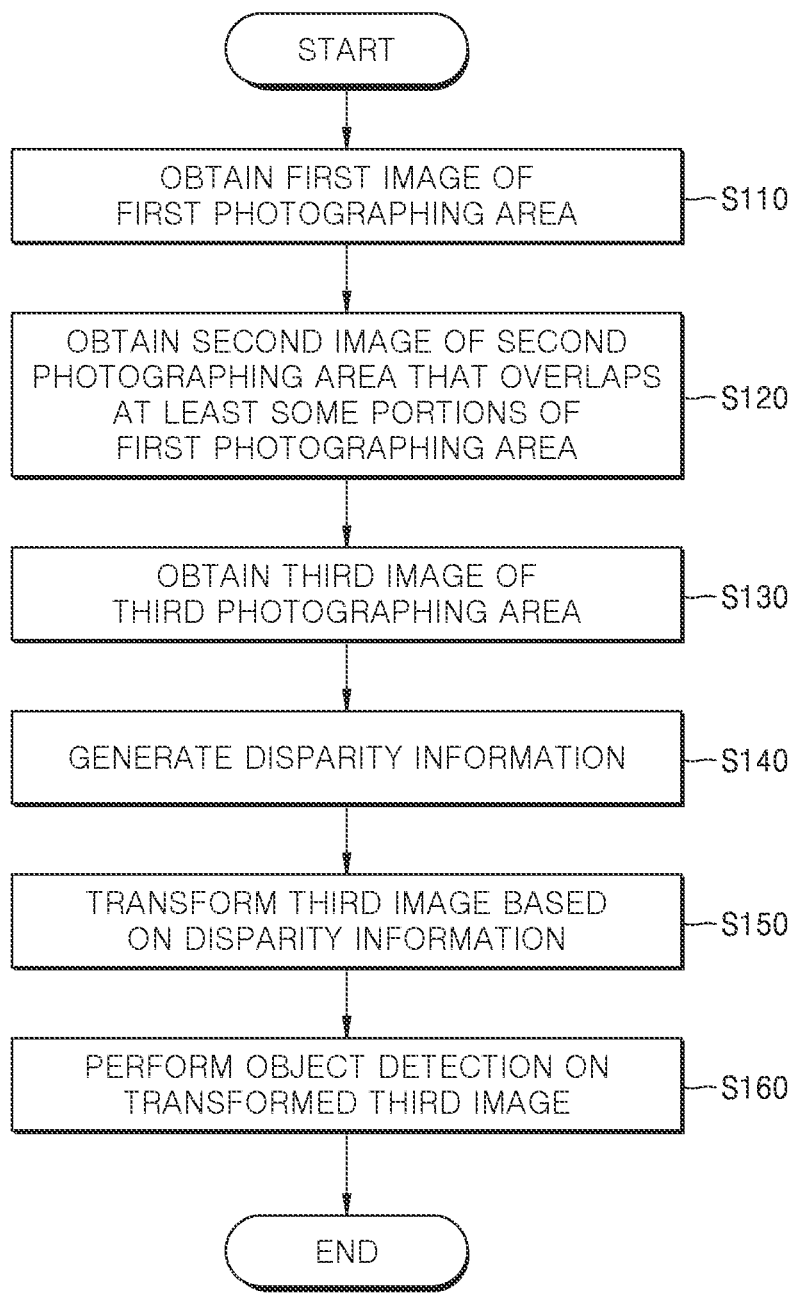

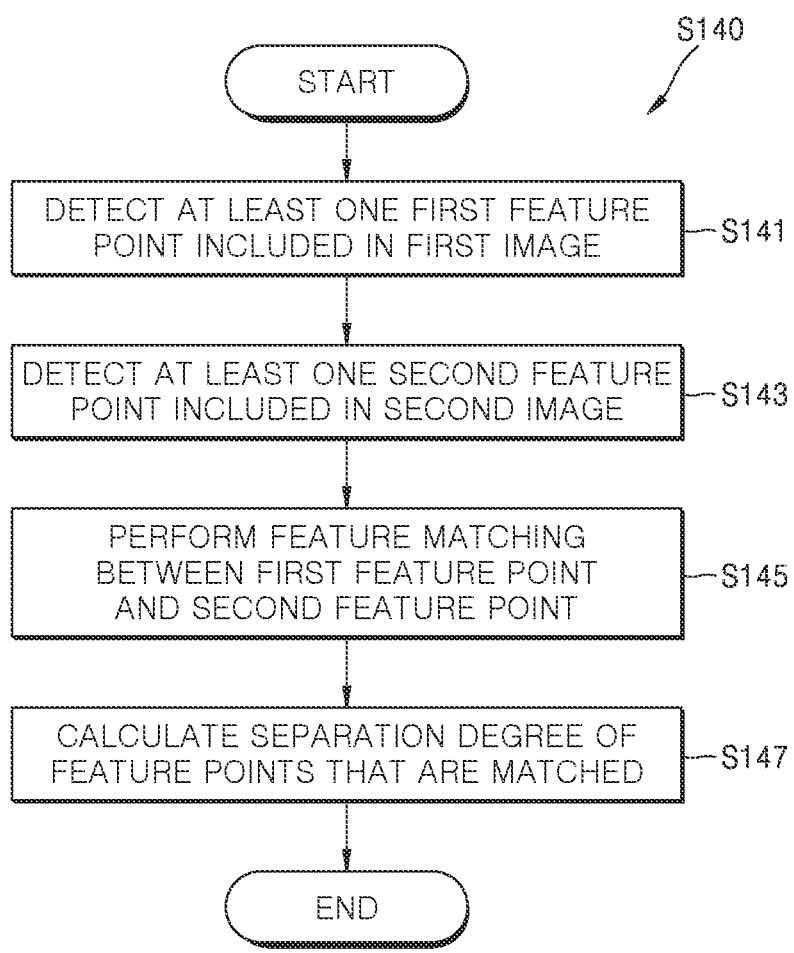

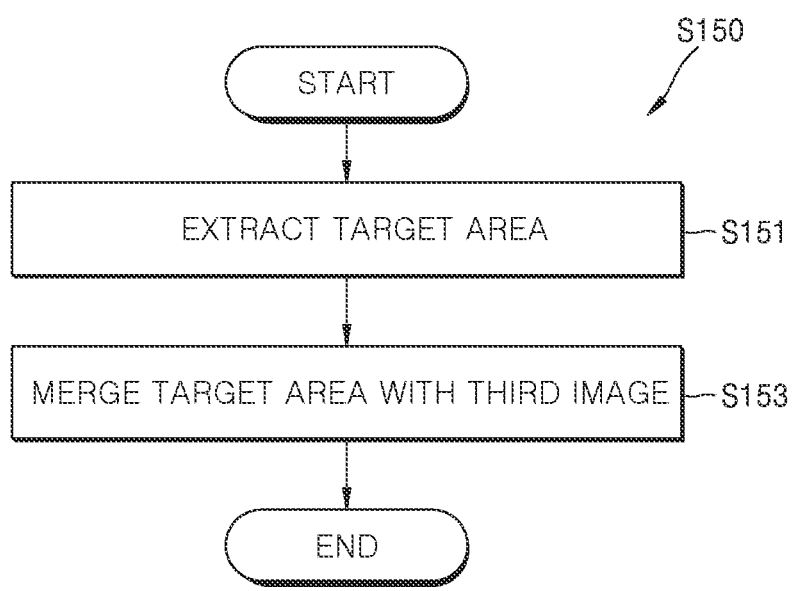

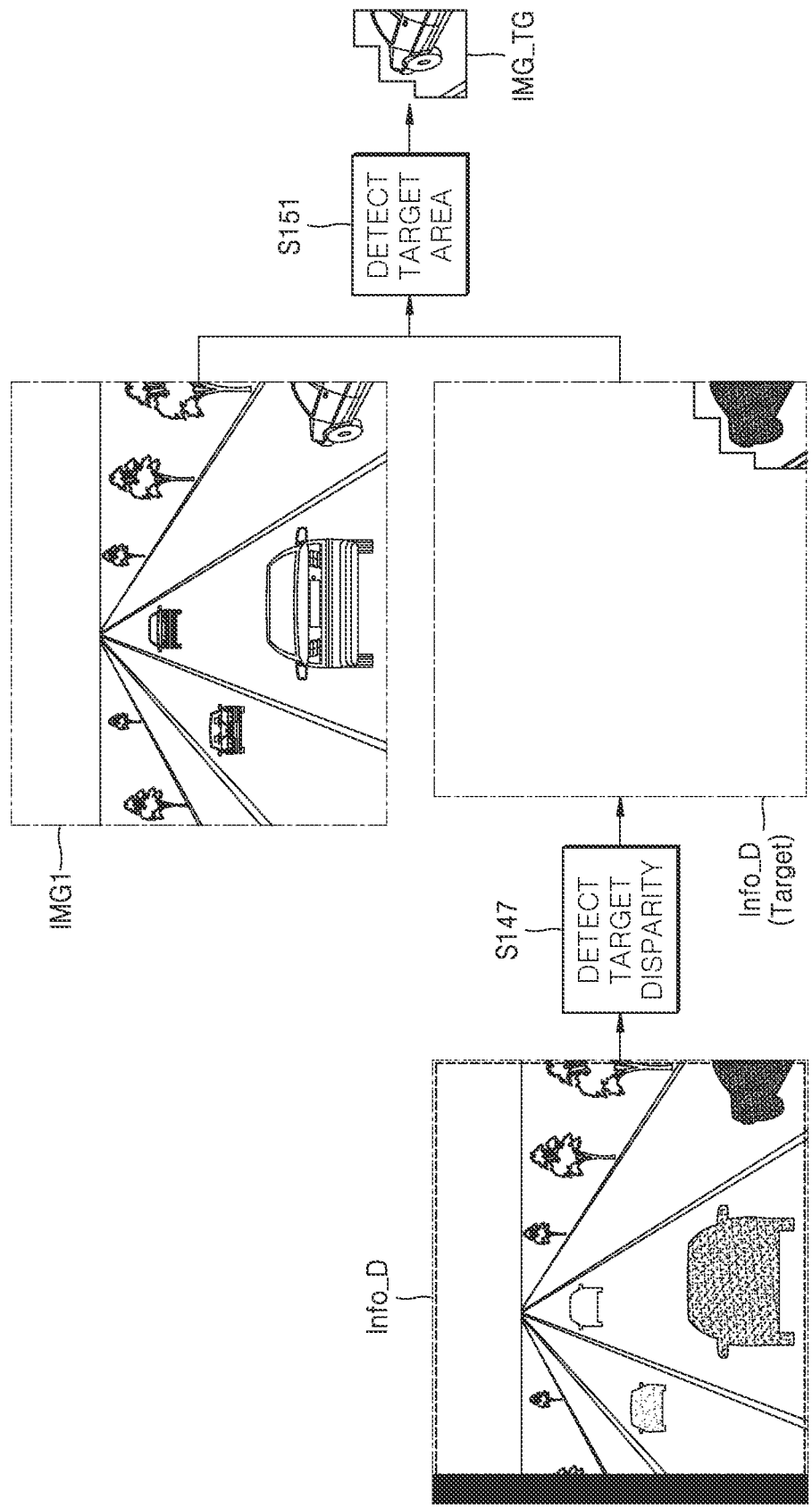

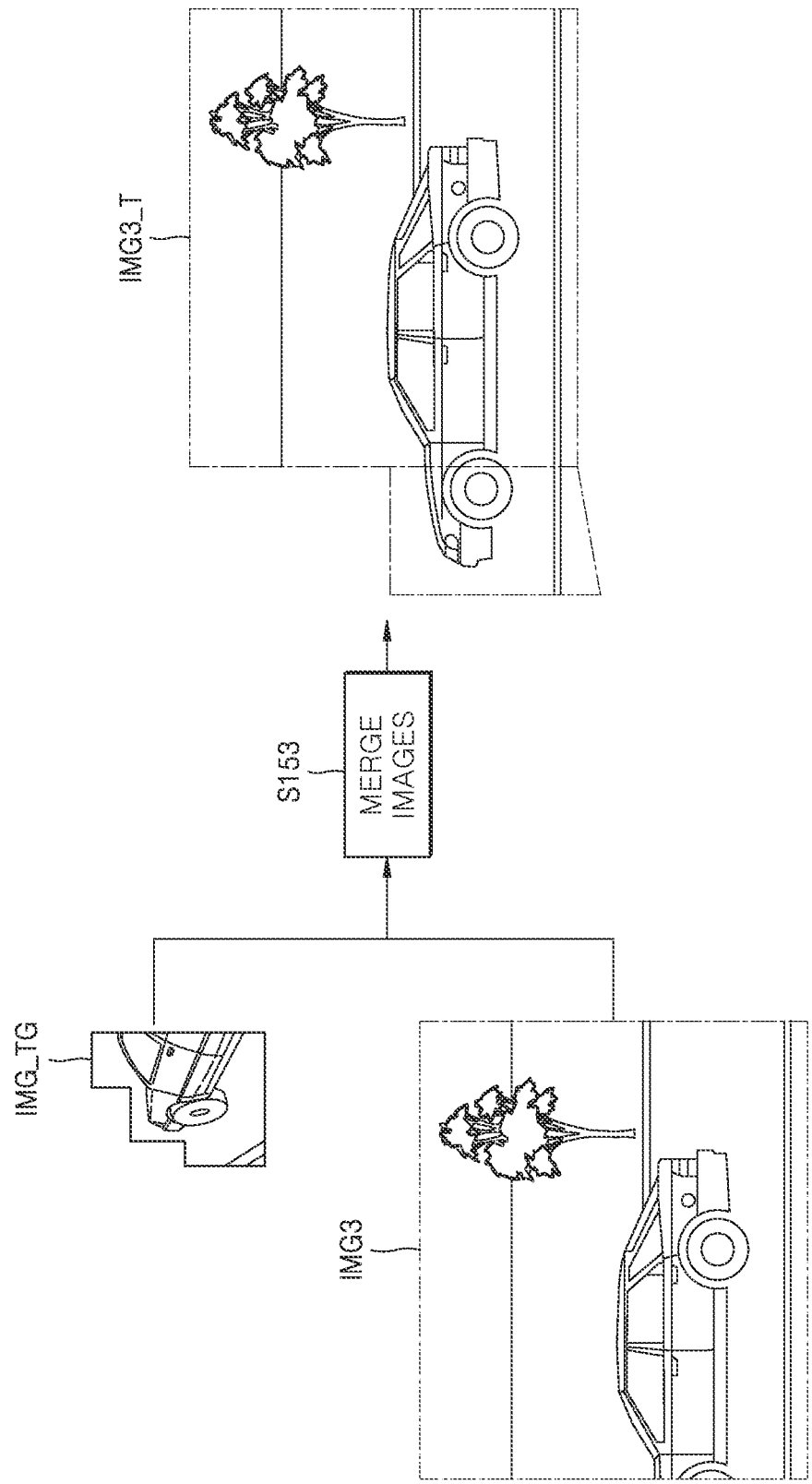

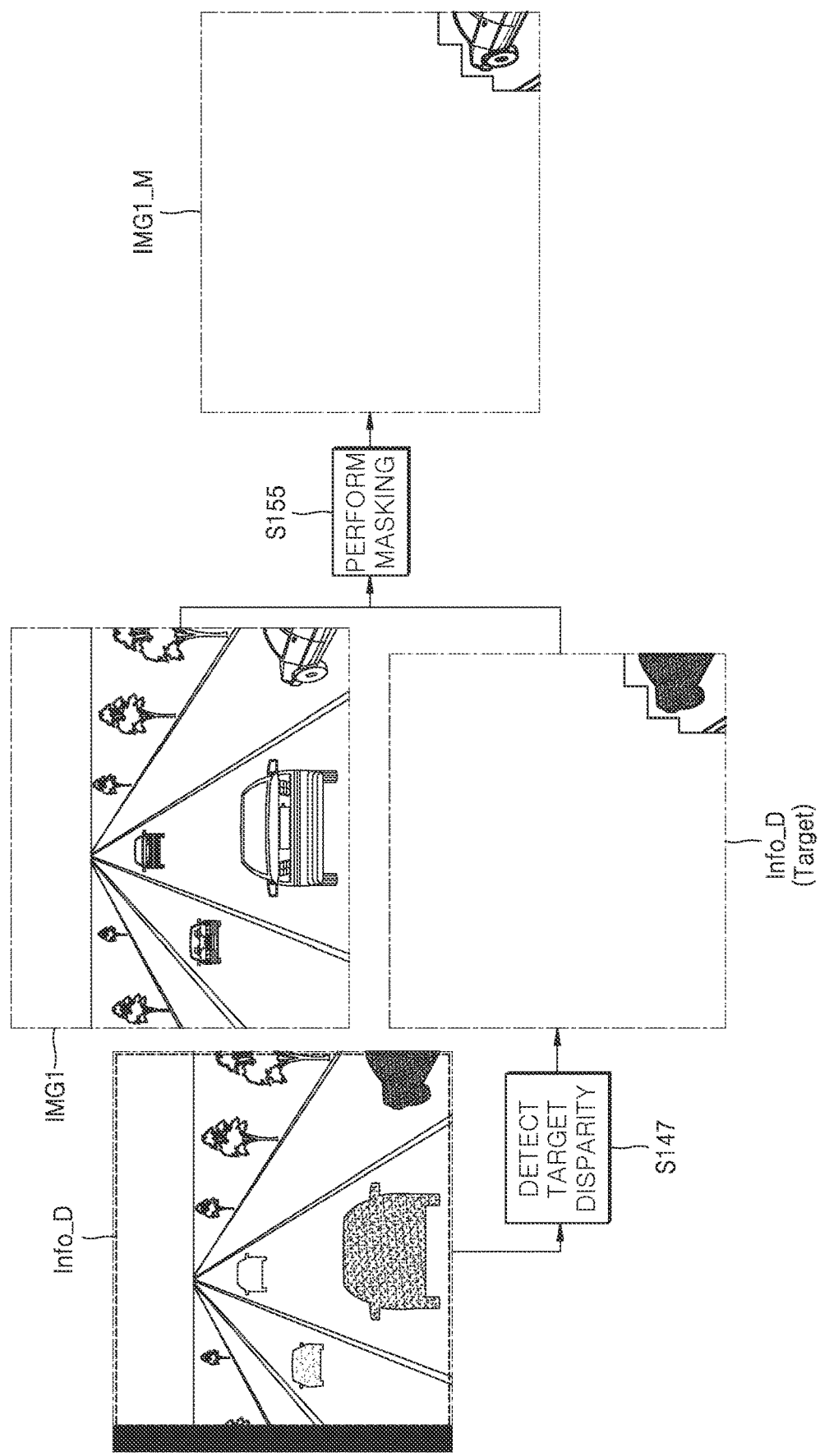

ELECTRONIC DEVICE FOR PERFORMING OBJECT DETECTION AND OPERATION METHOD THEREOF

CROSS-REFERENCE TO RELATED APPLICATION

This application claims the benefit of Korean Patent Application No. 10-2020-0064597, filed on May 28, 2020, in the Korean Intellectual Property Office, the disclosure of which is incorporated herein in its entirety by reference.

BACKGROUND

The disclosure relates to an electronic device for performing object detection and an operation method thereof, and more particularly, to an electronic device for performing object detection by using image sensors having photographing areas, which overlap each other, and an operation method of the electronic device.

A self-driving system (or an Advanced Driver Assistance System (ADAS)) may obtain information regarding a host vehicle and a surrounding environment from various types of sensors and may safely navigate by controlling the host vehicle based on the obtained information. In detail, the self-driving system may capture images of a surrounding environment of the host vehicle by using image sensors, perform object detection on the captured images, and may control a driving direction, speed, and the like of the host vehicle according to an object detection result.

The self-driving system may include an image sensor that mainly photographs a front view of the host vehicle and perform object detection on an image of the front view. When an object comes close to a left side or a right side of the host vehicle, the image of the front view may include only part of the object. Accordingly, it is difficult for the self-driving system to accurately detect, from the image of the front view, the object coming close to the left side or the right side of the host vehicle.

SUMMARY

According to one or more embodiments, an electronic device detects an image area corresponding to a proximity object based on two images captured in one direction, merges an image, which is captured in another direction and includes the proximity object, with the detected image area, and performs object detection on a merged image.

An electronic device includes a first image sensor configured to output a first image produced by photographing a first photographing area. A second image sensor outputs a second image produced by photographing a second photographing area that overlaps at least some portions of the first photographing area. A third image sensor outputs a third image produced by photographing a third photographing area. A processor performs object detection on at least one object included in an image. The processor generates disparity information indicating a separation degree of at least one feature point of the first image and the second image, transforms the third image based on the disparity information, and performs the object detection on the transformed third image.

According to one or more embodiments, an electronic device includes a first image sensor configured to output a first color image captured in a first direction. A depth sensor outputs a depth image corresponding to the first color image. A second image sensor outputs a second color image captured in a second direction. A processor performs object detection on at least one object included in an image. The processor transforms the second color image based on the first color image and the depth image and performs the object detection on the second color image that is transformed.

According to one or more embodiments, an operation method of an electronic device includes obtaining a first image produced by photographing a first photographing area; obtaining a second image produced by photographing a second photographing area that overlaps at least some portions of the first photographing area; obtaining a third image produced by photographing a third photographing area; generating disparity information indicating a separation degree of at least one feature point of the first image and the second image; transforming the third image based on the disparity information; and performing object detection on the third image that is transformed.

BRIEF DESCRIPTION OF THE DRAWINGS

Embodiments of the disclosure will be more clearly understood from the following detailed description taken in conjunction with the accompanying drawings in which:

FIG. 4 is a flowchart of an operation method of an electronic device, according to an embodiment;

FIG. 5 is a flowchart of a method of generating disparity information, according to an embodiment;

FIG. 7 is a flowchart of an image transformation method, according to an embodiment;

FIGS. 8A and 8B are diagrams of the image transformation method of FIG. 7;

FIGS. 10A and 10B are diagrams of the image transformation method of FIG. 9;

DETAILED DESCRIPTION OF THE EMBODIMENTS

Figure 1:
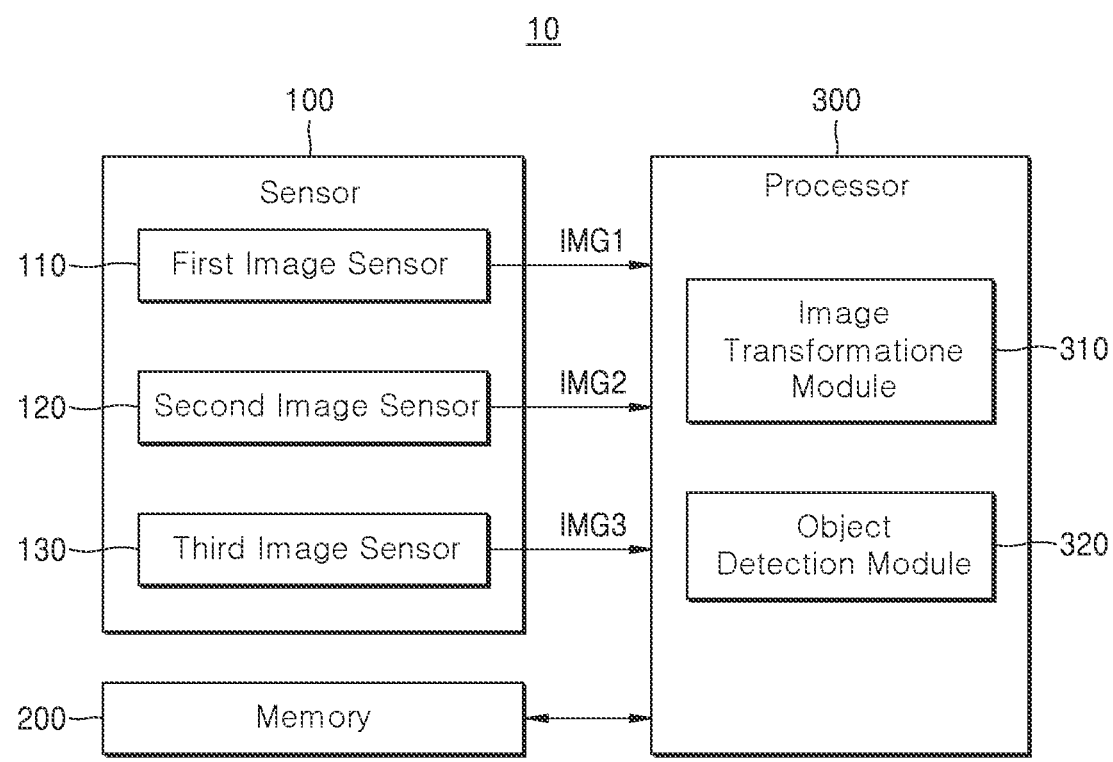
FIG. 1 is a block diagram of an electronic device according to an embodiment.

FIG. 1 is a block diagram of an electronic device 10 according to an embodiment.

Referring to FIG. 1, the electronic device 10 may include a sensor 100, a memory 200, and a processor 300. The electronic device 100 may be a device that performs image processing on images. The image processing may be a process of analyzing an image and performing object detection or segmentation on at least one object included in the image. Types of the image processing are not limited thereto and may include various processes.

The electronic device 10 may be realized as a personal computer (PC), an Internet of Things (IoT) device, or a portable electronic device. The portable electronic device may be included in various devices such as a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book reader, and a wearable device.

In an embodiment, the electronic device 10 may be a device that controls a host vehicle. The electronic device 10 may perform object detection based on images capturing a surrounding environment of the host vehicle and control the host vehicle according to an object detection result. Hereinafter, for convenience, it is assumed that the electronic device 10 is a device that controls the host vehicle.

The sensor 100 may include sensors that generate information regarding the surrounding environment. For example, the sensor 100 may include an image sensor such as a Charge Coupled Device (CCD) or a Complementary Metal Oxide Semiconductor (CMOS). In an example, the sensor 100 may include a first image sensor 110, a second image sensor 120, and a third image sensor 130.

The first image sensor 110 may output a first image IMG1 of a first photographing area, the second image sensor 120 may output a second image IMG2 of a second photographing area, and the third image sensor 130 may output a third image IMG3 of a third photographing area. In an embodiment, the first image sensor 110 and the second image sensor 120 may be arranged adjacent to each other and capture images in the same direction or a similar direction. Accordingly, the first photographing area of the first image sensor 110 may overlap most of the second photographing area of the second image sensor 120. As a gap between the first image sensor 110 and the second image sensor 120 is small, a region where the first photographing area overlaps the second photographing area may increase. The first image sensor 110 and the second image sensor 120 may each be realized as a stereo camera (not shown). Also, a first image IMG1 and a second image IMG2 may be referred to as stereo images.

In an embodiment, the third image sensor 130 may capture an image in a direction perpendicular to a photographing direction of the first image sensor 110 or the second image sensor 120. For example, the first image sensor 110 and the second image sensor 120 may photograph a front view of the host vehicle, and the third image sensor 130 may photograph a side view of the host vehicle. As another example, the first image sensor 110 and the second image sensor 120 may photograph a rear view of the host vehicle, and the third image sensor 130 may photograph the side view of the host vehicle.

In the above examples, according to embodiments, the third image sensor 130, which photographs the side view of the host vehicle, may include at least two image sensors photographing a left side view and/or a right side view of the host vehicle. For example, when the third image sensor 130 includes two image sensors and photographs one of the left side view and the right side view of the host vehicle, at least two image sensors may have photographing areas overlapping each other. As another example, when the third image sensor 130 includes two image sensors and photographs the left and right side views of the host vehicle, at least two image sensors may include different photographing areas.

For convenience of explanation, hereinafter, it is assumed that the first image sensor 110 and the second image sensor 120 photograph the front view of the host vehicle and that the third image sensor 130 includes one image sensor and photographs the side view of the host vehicle.

The third photographing area of the third image sensor 130 may overlap at least one of the first photographing area and the second photographing area. Because the third image sensor 130 captures an image in a vertical direction, overlapping of the third photographing area with the first or second photographing area may be relatively smaller than overlapping of the first photographing area with the second photographing area. A photographing direction of the third image sensor 130 is not limited thereto. The photographing direction of the third image sensor 130 is a direction in which the third photographing area overlaps the first or second photographing area.

When the object (e.g., a peripheral vehicle) comes close to a left side or a right side of the front of the electronic device 10, only part of the object (e.g., a front portion of the peripheral vehicle) may be included in the first image IMG1 or the second image IMG2. Also, when the object is located in a photographing direction of the third image sensor 130, other portions of the object (e.g., middle and rear portions of the peripheral vehicle) may be included in the third image IMG3. In this case, although the first image IMG1, the second image IMG2, and the third image IMG3 are analyzed, it may be difficult for the processor 300 to detect a proximity object close to the electronic device 10.

As a storage in which data is stored, the memory 200 may store data generated by the sensor 100 and various pieces of data generated while the processor 300 performs calculations. For example, the memory 200 may store the first to third images IMG1 to IMG3 that are obtained by the first to third image sensors 110 to 130. As described below with regard to the operation of the processor 300, the memory 200 may store a processing result according to the image processing of the processor 300.

The processor 300 may control all operations of the electronic device 10. The processor 300 may include various operation processors such as a Central Processing Unit (CPU), a Graphic Processing Unit (GPU), an Application Processor (AP), a Digital Signal Processor (DSP), a Field-Programmable Gate Array (FPGA), a Neural network Processing unit (NPU), an Electronic Control Unit (ECU), and an Image Signal Processor (ISP).

The processor 300 according to an embodiment may include an image transformation module 310. The image transformation module 310 may transform the third image IMG3 based on the first and second images IMG1 and IMG2. In an embodiment, the image transformation module 310 may generate disparity information indicating a separation degree of at least one common feature point of the first image IMG1 and the second image IMG2 and may transform the third image IMG3 based on the generated disparity information. An image transformation operation of the image transformation module 310 will be described below in more detail.

Because the first image sensor 110 and the second image sensor 120 are arranged adjacent to each other, at least one object may be commonly included in the first image IMG1 and the second image IMG2. Therefore, feature points of the object that is commonly included may be commonly included in the first image IMG1 and the second image IMG2 as well. Here, the term 'feature point' is a point indicating a feature of an object and denotes pixels forming the object. The image transformation module 310 may detect a common feature point by analyzing the first image IMG1 and the second image IMG2 and may generate the disparity information based on a difference between a location of the feature point of the first image IMG1 and a location of the feature point of the second image IMG2.

The disparity information may have different values according to a distance between the electronic device 10 and the object. For example, when the first object is in a remote place, the difference between the location of the feature point of the first image IMG1 and the location of the feature point of the second image IMG2 is small. Therefore, a disparity value of a feature point of a first object may be relatively small. As another example, when a second object comes close to the electronic device 10, the difference between the location of the feature point of the first image IMG1 and the location of the feature point of the second image IMG2 is great. Therefore, a disparity value regarding the feature point of the second object may be relatively great. The image transformation module 310 may transform the third image IMG3 by using features of the above disparity values.

In detail, the image transformation module 310 may detect an area, which corresponds to the proximity object close to the electronic device 10, from the first image IMG1 or the second image IMG2, based on the disparity information. For example, because a disparity value regarding a feature point forming the proximity object is relatively great, the image transformation module 310 may detect an area of the first image IMG1 or the second image IMG2, which has a great disparity value, as an area corresponding to the proximity object.

The image transformation module 310 may merge an area including the detected area with the third image IMG3. For example, the image transformation module 310 may merge an area of the first image IMG1 or the second image IMG2, which corresponds to a portion (e.g., a front portion of the peripheral vehicle) of the proximity object, with an area of the third image IMG3, which relates to other portions (e.g., middle and rear portions of the peripheral vehicle) of the proximity object, thereby transforming the third image IMG3 to include the entire object. In the above examples, it is described that a portion of the proximity object is included in the first image IMG1 or the second image IM2 and that other portions of the proximity object are included in the third image IMG3, but this is merely an example. Portions of the proximity object may be overlappingly included in the first to third images IMG1 to IMG3.

The processor 300 may include an object detection module 320. The object detection module 320 may detect at least one object included in an image. In an embodiment, the object detection module 320 may detect an object included in at least one of the first to third images IMG1 to IMG3. Also, the object detection module 320 may detect an object included in the third image IMG3 that is converted by the image transformation module 310. In detail, the object detection module 320 may detect the object from the third image IMG3 transformed to include the entire proximity object that is close to the electronic device 10.

The image transformation module 310 and the object detection module 320 may each be realized as firmware or software and may be loaded on the memory 200 and executed by the processor 300. However, one or more embodiments are not limited thereto. The image transformation module 310 and the object detection module 320 may each be realized as hardware or a combination of software and hardware.

FIG. 1 illustrates that the electronic device 10 includes the first to third image sensors 110 to 130. However, according to embodiments, the electronic device 10 may not include the first to third image sensors 110 to 130 or may include at least some of them and may receive at least one of the first to third images IMG1 to IMG3 from an external device.

Also, FIG. 1 illustrates that the electronic device 10 includes the memory 200, but according to an embodiment, the electronic device 10 may be separated from the memory 200.

The electronic device 10 according to an embodiment may detect an image area corresponding to the proximity object by using two images captured in one direction, merge an image, which is captured in another direction and includes the proximity object, with the detected area, and perform the object detection on the merged image, thereby accurately detecting the proximity object.

Hereinafter, referring to FIGS. 2 and 3, features of the first to third images IMG1 to IMG3 captured by the first to third image sensors 110 to 130 of the electronic device 10 will be described.

Figure 2:
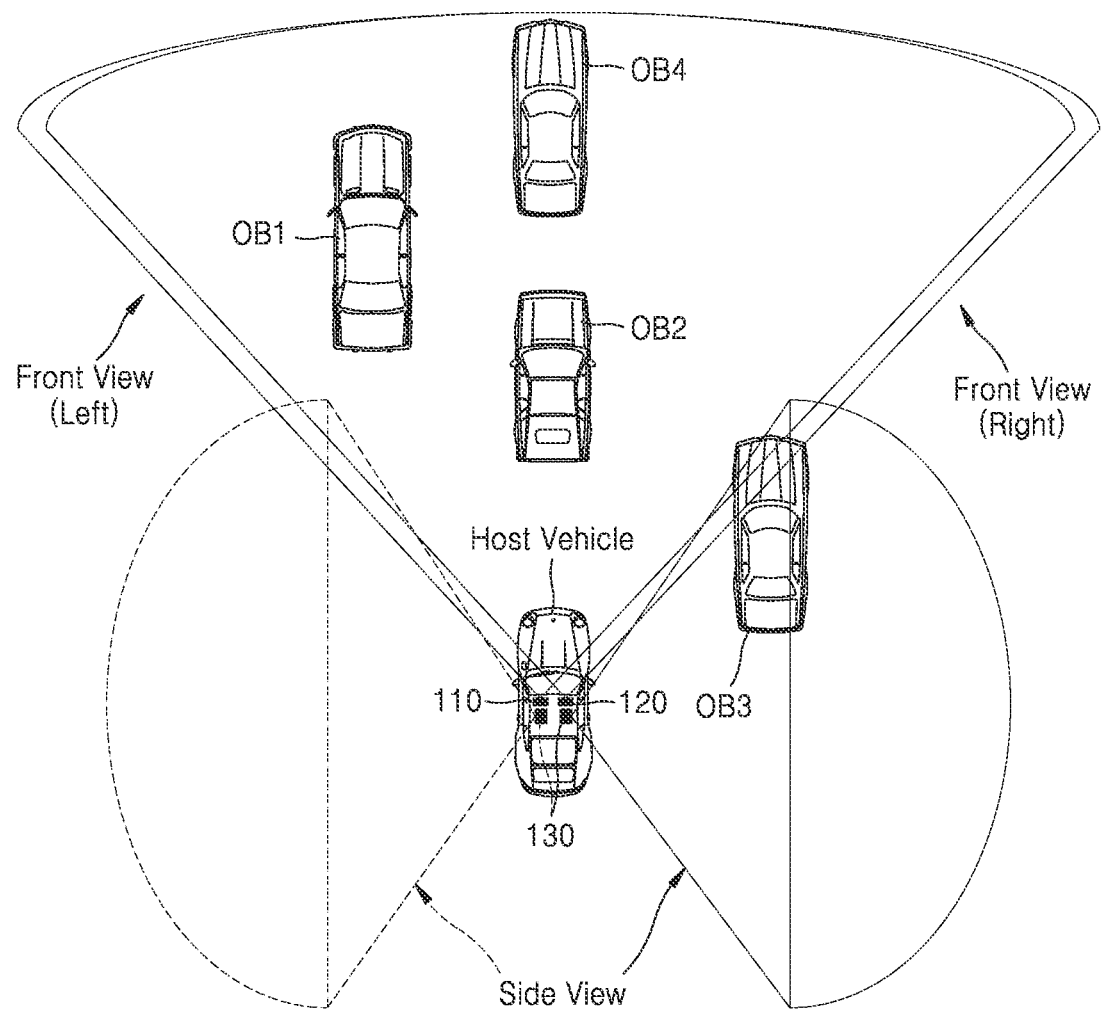
FIG. 2 is a diagram illustrating photographing areas of image sensors, according to an embodiment.

FIG. 2 is a diagram illustrating photographing areas of the first to third image sensors 110 to 130, according to an embodiment. In detail, FIG. 2 illustrates the photographing areas of the first image sensor 110, the second image sensor 120, and the third image sensor 130 of FIG. 1.

Referring to FIGS. 1 and 2, the electronic device 10 may be on the host vehicle and photograph a surrounding environment of the host vehicle. The first image sensor 110 may photograph a front view (left) of the host vehicle, the second image sensor 120 may photograph a front view (right) of the host vehicle, and the third image sensor 130 may photograph a side view of the host vehicle. FIG. 2 illustrates that the third image sensor 130 photographs a right side view of the host vehicle, but this is merely an example. The third image sensor 130 may photograph a left side view of the host vehicle. As described, the electronic device 10 may capture images of situations around the host vehicle by using the first to third image sensors 110 to 130 and may perform object detection on the captured images.

Objects OB1 to OB4 may be in vicinity of the electronic device 10. Referring to FIG. 2, the first object OB1, the second object OB2, and the fourth object OB4 may be located in respective photographing areas of the first image sensor 110 and the second image sensor 120. The third object OB3 may only be partially present in the photographing area of each of the first to third image sensors 110 to 130.

Figure 3:
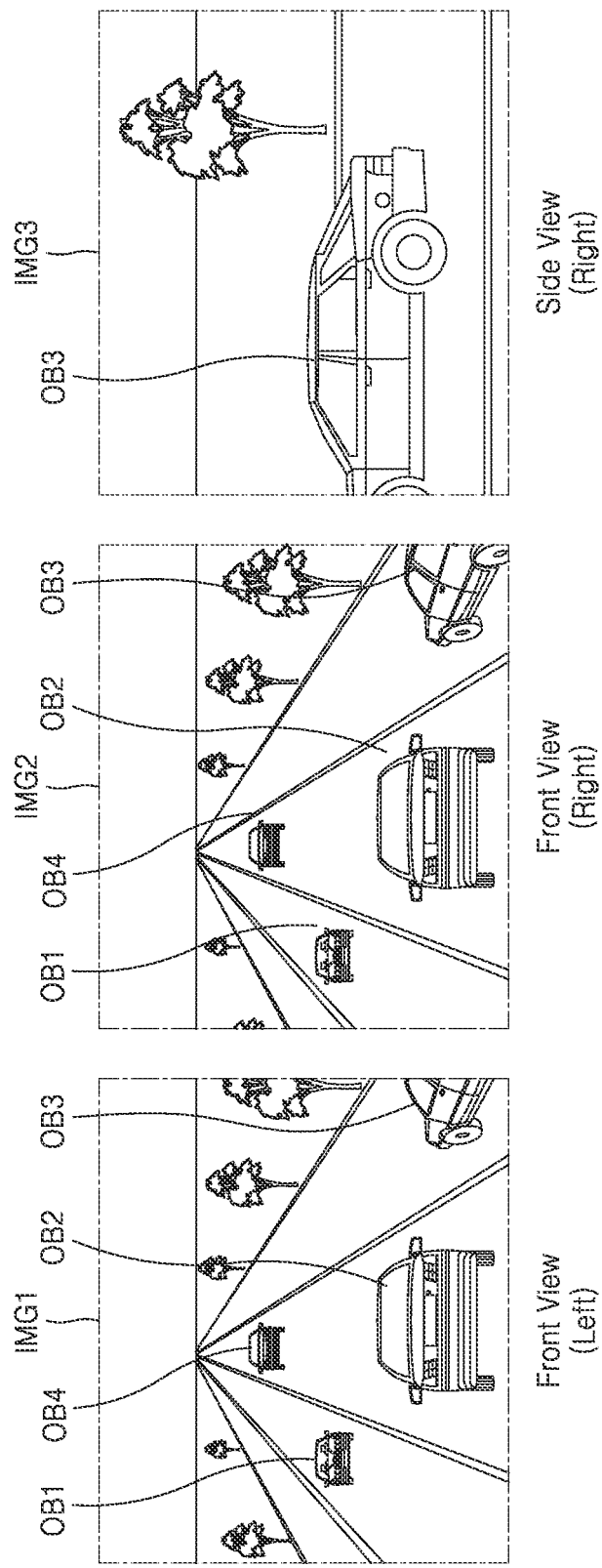
FIG. 3 is a diagram of images captured by image sensors, according to an embodiment.

FIG. 3 is a diagram of images captured by image sensors, according to an embodiment. In detail, FIG. 3 is a diagram illustrating first to third images IMG1 to IMG3 captured by the first to third images sensors 110 to 130 of FIG. 1 and including the first to fourth objects OB1 to OB4 of FIG. 2.

Referring to FIGS. 1 to 3, the first image IMG1 captured by the first image sensor 110 and the second image IMG2 captured by the second image sensor 120 may include the first object OB1, the second object OB2, and the fourth object OB4. Therefore, the electronic device 10 may detect the first object OB1, the second object OB2, and the fourth object OB4 by performing the object detection on the first image IMG1 or the second image IMG2.

The first image IMG1 and the second image IMG2 may include only a front portion of the third object OB3 that is the closest to the host vehicle. The third image IMG3 captured by the third image sensor 130 may include a middle portion and a rear portion of the third object OB3. Therefore, the electronic device 10 may unlikely detect the third object OB3 even though the object detection is performed on the first image IMG1, the second image IMG2, or the third image IMG3.

The processor 300 may transform the third image IMG3 to accurately detect the third object OB3. In detail, the processor 300 may generate disparity information of the first image IMG1 and the second image IMG2. Also, the processor 300 may detect an area of the first image IMG1 or the second image IMG2 (e.g., a front portion), which corresponds to the third object OB3, based on the generated disparity information. The processor 300 may transform the third image IMG3 by merging the detected area (e.g., the front portion) with an area associated with the third object OB3 of the third image IMG3. The processor 300 may detect the third object OB3 by performing the object detection on the transformed third image IMG3.

FIG. 4 is a flowchart of an operation method of an electronic device 10, according to an embodiment. In detail, FIG. 4 is a flowchart of an operation method of the electronic device 10 of FIG. 1. At least some of operations of FIG. 4 may be performed by the processor 300 by using the image transformation module 310 and the object detection module 320.

Referring to FIGS. 1 and 4, in operation S110, the electronic device 10 may obtain the first image IMG1 of the first photographing area. In detail, the electronic device 10 may obtain the first image IMG1 of the first photographing area that is captured by the first image sensor 110. However, one or more embodiments are not limited thereto, and the electronic device 10 may obtain the first image IMG1 from an external device.

In operation S120, the electronic device 10 may obtain the second image IMG2 of the second photographing area that overlaps at least some portions of the first photographing area. In detail, the electronic device 10 may obtain the second image IMG2 of the second photographing area that is captured by the second image sensor 120. However, one or more embodiments are not limited thereto, and the electronic device 10 may obtain the second image IMG2 from the external device.

In operation S130, the electronic device 10 may obtain the third image IMG3 of the third photographing area. In detail, the electronic device 10 may obtain the third image IMG3 of the third photographing area that is captured by the third image sensor 130. However, one or more embodiments are not limited thereto, and the electronic device 10 may obtain the third image IMG3 from the external device. The third photographing area may overlap the first photographing area or the second photographing area.

In operation S140, the electronic device 10 may generate the disparity information. In detail, the electronic device 10 may generate the disparity information indicating a separation degree of at least one common feature point of the first image IMG1 and the second image IMG2.

In operation S150, the electronic device 10 may transform the third image IMG3 based on the generated disparity information. In detail, the electronic device 10 may detect the area, which indicates the proximity object close to the electronic device 10, from the first image IMG1 or the second image IM2 based on the disparity information and may transform the third image IMG3 by merging the detected area with the third image IMG3. In operation S160, the electronic device 10 may perform the object detection on the transformed third image IMG3.

FIG. 5 is a flowchart of a method of generating the disparity information, according to an embodiment. In detail, FIG. 5 is a diagram for explaining a detailed operation (operation S140) of the method of generating the disparity information of FIG. 4. At least some of operations of FIG. 5 may be performed by the processor 300 by using the image transformation module 310.

Referring to FIGS. 1, 4 and 5, in operation S141, the electronic device 10 may detect at least one first feature point included in the first image IMG1. In operation S143, the electronic device 10 may detect at least one second feature point included in the second image IMG2. The first image IMG1 and the second image IMG2 are respectively captured by the first image sensor 110 and the second image sensor 120 that have the photographing areas that overlap each other, and thus, the first image IMG1 and the second image IMG2 may commonly include at least one object.

In operation S145, the electronic device 10 may perform feature matching between the first feature point and the second feature point. In detail, the electronic device 10 may match the first and second feature points, which correspond to each other, for each of objects that are commonly included in the first image IMG1 and the second image IMG2.

In operation S147, the electronic device 10 may calculate a separation degree of the matched feature points. In detail, the electronic device 10 may generate the disparity information by calculating a difference between the locations of the first feature point and the second feature point that are matched. A method whereby the electronic device 10 generates the disparity information is not limited thereto, and the disparity information may be generated in various manners.

Figure 6A:
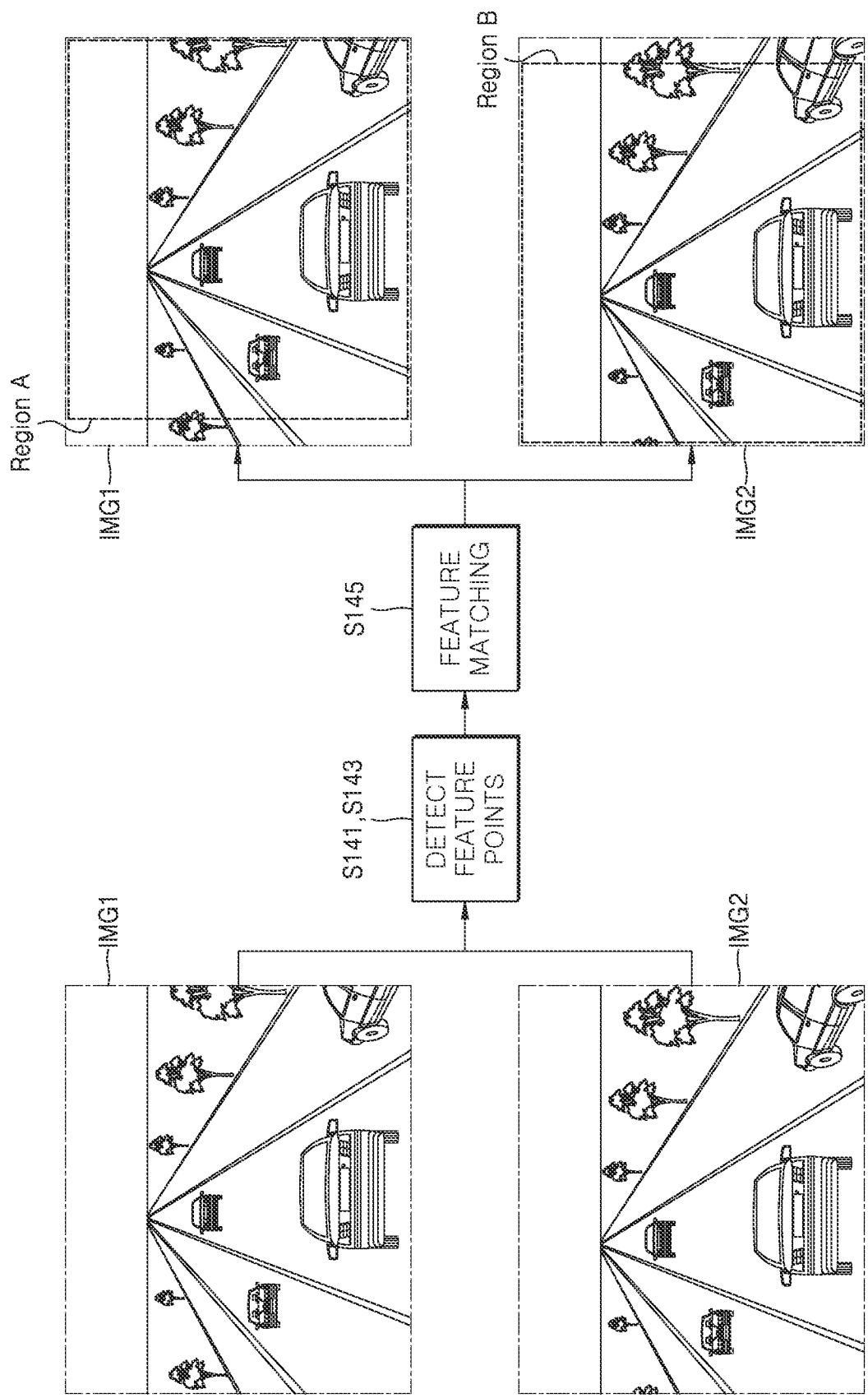
FIGS. 6A and 6B are diagrams of a method of generating disparity information, according to an embodiment.
Figure 6B:
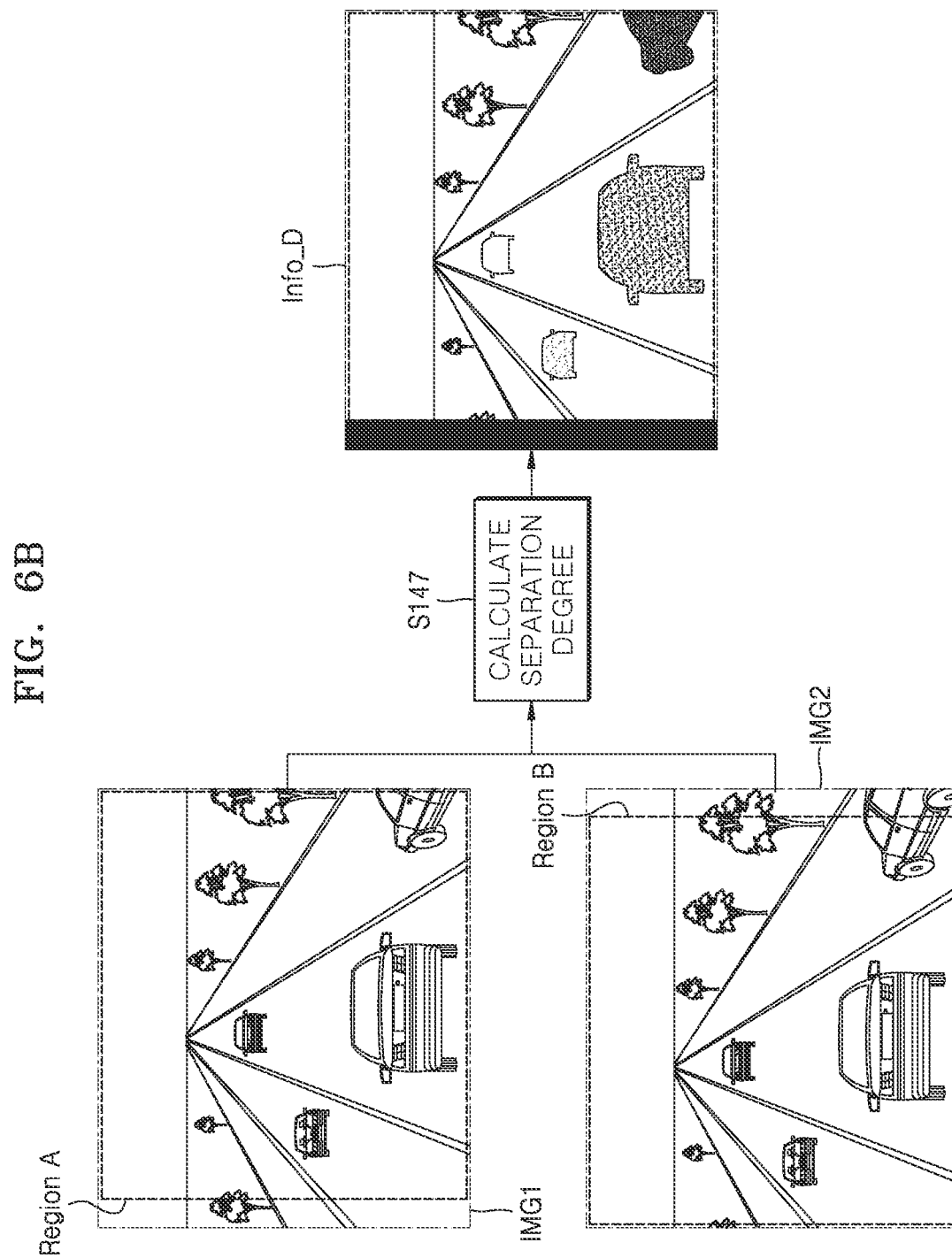

FIGS. 6A and 6B are diagrams of a method of generating the disparity information, according to an embodiment.

Referring to FIGS. 1 and 6A, the electronic device 10 may detect at least one first feature point included in the first image IMG1. For example, in operation S141, the electronic device 10 may detect at least one first feature point constituting an object, for example, a neighboring vehicle, a road, a tree, or the like, which is included in the first image IMG1. In operation S143, the electronic device 10 may detect at least one second feature point constituting an object, for example, a neighboring vehicle, a road, a tree, or the like, which is included in the second image IMG2.

In operation S145, the electronic device 10 may match the first and second feature points that are detected. For example, for a peripheral vehicle that is commonly included in the first image IMG1 and the second image IMG2, the electronic device 10 may match a first feature point constituting the peripheral vehicle in the first image IMG1 and a second feature point constituting the peripheral vehicle in the second image IMG2. The electronic device 10 may perform feature matching identically on roads, trees, and the like that are commonly included in the first image IMG1 and the second image IMG2.

The electronic device 10 may determine areas of the first image IMG1 and the second image IMG2, which include the matched feature points, and generate the disparity information by using the determined areas. For example, because the first image IMG1 is an image captured by the first image sensor 110 located on a left side of the second image sensor 120, a left edge of the first image IMG1 may correspond to an area excluded from the photographing area of the second image sensor 120. Therefore, the electronic device 10 may not detect the second feature point that is matched with the first feature point that is located on the left edge of the first image IMG1. Accordingly, the electronic device 10 may determine that a region A except for the left edge of the first image IMG1 is used to generate the disparity information.

Also, because the second image IMG2 is an image captured by the second image sensor 120 located on a right side of the first image sensor 110, a right edge of the second image IMG2 may be an area excluded from the photographing area of the first image sensor 110. Therefore, the electronic device 10 may not detect the first feature point matched with the second feature point that is located on the right edge of the second image IMG2. Accordingly, the electronic device 10 may determine that a region B except for the right edge of the second image IMG2 is used to generate the disparity information.

Referring to FIGS. 1 and 6B, in operation S147, the electronic device 10 may calculate disparity values that indicate the separation degree of the feature points by using the Region A and the Region B. For example, the electronic device 10 may calculate the separation degree by deducting a location value of the second feature point of the second image IMG2 from a location value of the first feature point of the first image IMG1. Because the left edge of the first image IMG1 does not include the second feature point that is matched, the left edge may be set to have a value that is set in advance. Also, because the right edge of the second image IMG2 does not include the first feature point that is matched, the right edge may not be used to calculate the separation degree. The electronic device 10 may generate disparity information Info_D by merging disparity values indicating the separation degree of each feature point.

FIG. 7 is a flowchart of an image transformation method, according to an embodiment. In detail, FIG. 7 is a diagram for explaining a detailed operation (S150) of the image transformation method, based on the disparity information of FIG. 4. At least some of operations of FIG. 7 may be performed by the processor 300 by using the image transformation module 310.

Referring to FIGS. 1, 4, and 7, in operation S151, the electronic device 10 may extract a target area from the first image IMG1 or the second image IMG2. Here, the target area may be an area of the first image IMG1 or the second image IMG2 to be merged with the third image IMG3. In an embodiment, the electronic device 10 may extract the target area from the first image IMG1 or the second image IMG2, based on the disparity information. For example, the electronic device 10 may extract, as a target area, an area of the first image IMG1 or the second image IMG2 that has a disparity value that is equal to or greater than a threshold value. Here, the threshold value may be a disparity value that the electronic device 10 may have when the object comes close thereto and may be set by a manufacturer or a user.

In another embodiment, the electronic device 10 may extract an area, which overlaps the third photographing area of the third image sensor 130, from the first image IMG1 as the target area. Alternatively, the electronic device 10 may extract an area, which overlaps the third photographing area of the third image sensor 130, from the second image IMG2 as the target area.

In operation S153, the electronic device 10 may transform the third image IMG3 by merging the extracted target area with the third image IMG3. In detail, the electronic device 10 may warp the target area and may merge the warped target area with the third image IMG3.

In an embodiment, the electronic device 10 may include mapping information including a coordinate value of the third image IMG3 that corresponds to each coordinate value of the first image IMG1 or the second image IMG2. The electronic device 10 may identify the corresponding coordinate value of the third image IMG3 for each pixel forming the target area, based on the mapping information. The electronic device 10 may merge a pixel value of each pixel forming the target area with the identified coordinate value of the third image IMG3.

In another embodiment, for quicker calculation, the electronic device 10 may only detect a coordinate value of the third image IMG3 corresponding to each feature point included in the target area, instead of each pixel forming the target area. The electronic device 10 may merge a preset-sized image (that is, a portion of the target area), which includes each feature point, with the detected coordinate value of the third image IMG3.

When merging the target area with the third image IMG3, the electronic device 10 may merge, with the third image IMG3, the pixel values of the target area as well as the disparity values corresponding to the target area. For example, the electronic device 10 may merge the disparity values corresponding to the target area with the third image IMG3. As another example, the electronic device 10 may generate depth information indicating a depth value based on the disparity values corresponding to the target area and may merge the generated depth information with the third image IMG3. As another example, the electronic device 10 may generate distance information indicating a distance to the host vehicle based on the generated depth information and may merge the generated distance information with the third image IMG3. A method whereby the electronic device 10 merges the disparity values with the third image IMG3 is not limited thereto. The electronic device 10 may perform the object detection based on the disparity values and the pixel values of the third image IMG3 that is transformed.

A method whereby the electronic device 10 merges the target area with the third image IMG3 is not limited thereto and may vary.

FIGS. 8A and 8B are diagrams of the image transformation method of FIG. 7.

Referring to FIGS. 1, 7 and 8A, the electronic device 10 may detect target disparity values Info_D(Target), which are equal to or greater than the threshold value, from the disparity information Info_D. In operation S151, the electronic device 10 may extract the target area based on the detected target disparity values Info_D(Target) and the first image IMG1. In detail, the electronic device 10 may extract an area of the first image IMG1, which has the detected target disparity values Info_D(Target), as the target area IMG_TG.

Referring to FIGS. 1, 7, and 8B, the electronic device 10 may generate a transformed third image IMG3_T by merging an extracted target area IMG_TG with the third image IMG3 in operation S153. For example, the electronic device 10 may detect the coordinate value of the third image IMG3 that corresponds to each feature point included in the target area IMG_TG. The electronic device 10 may merge an image, which has a preset size and includes each feature point, with the identified coordinate value of the third image IMG3. In this case, according to an embodiment, the electronic device 10 may merge, with the detected coordinate value of the third image IMG3, the disparity values corresponding to the preset-sized image including each feature point. A method of merging the disparity values with the third image IMG3 may be substantially the same as the above-described method of FIG. 7, and thus, descriptions of the method will be omitted.

The coordinate value of the third image IMG3 corresponding to the feature point may exceed a coordinate value range of pixels forming the existing third image IMG3. Therefore, the transformed third image IMG3_T may have a greater size than the existing third image IMG3.

FIGS. 8A and 8B illustrate that the first image IMG1 is used, but one or more embodiments are not limited thereto. The second image IMG2 may be used.

Figure 9:
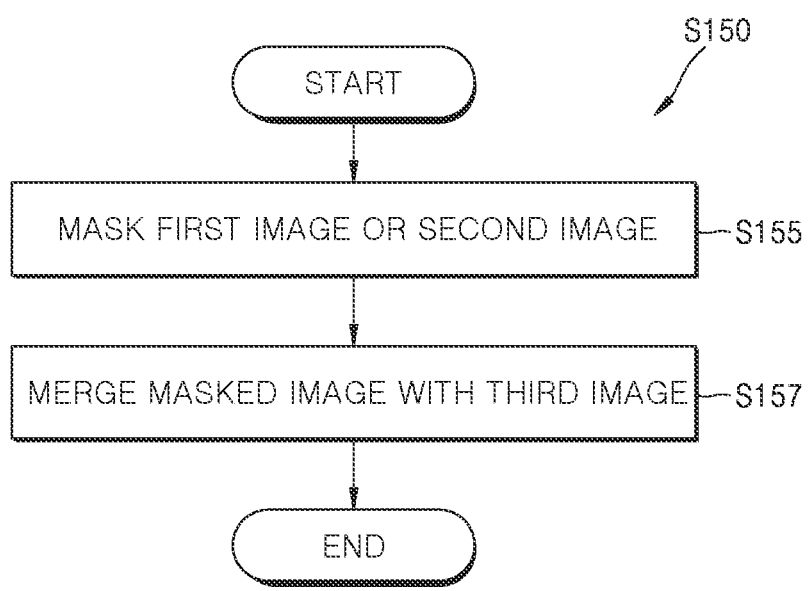
FIG. 9 is a flowchart of an image transformation method according to an embodiment.

FIG. 9 is a flowchart of an image transformation method according to an embodiment. In detail, FIG. 9 is a diagram of a modifiable embodiment of FIG. 7. That is, FIG. 9 is a diagram for explaining a detailed operation (S150) of the image transformation method based on the disparity information of FIG. 4. At least some of operations of FIG. 9 may be performed by the processor 300 of the electronic device 10.

Referring to FIGS. 1, 4, and 9, in operation S155, the electronic device 10 may mask areas of the first image IMG1 or the second image IMG2 other than the target area instead of extracting the target area from the first image IMG1 or the second image IMG2.

In operation S157, the electronic device 10 may merge the masked image with the third image IMG3. A method of merging the masked image with the third image IMG3 may be substantially the same as the above-described method of FIG. 7, and thus, descriptions thereof will be omitted.

Figure 10B:
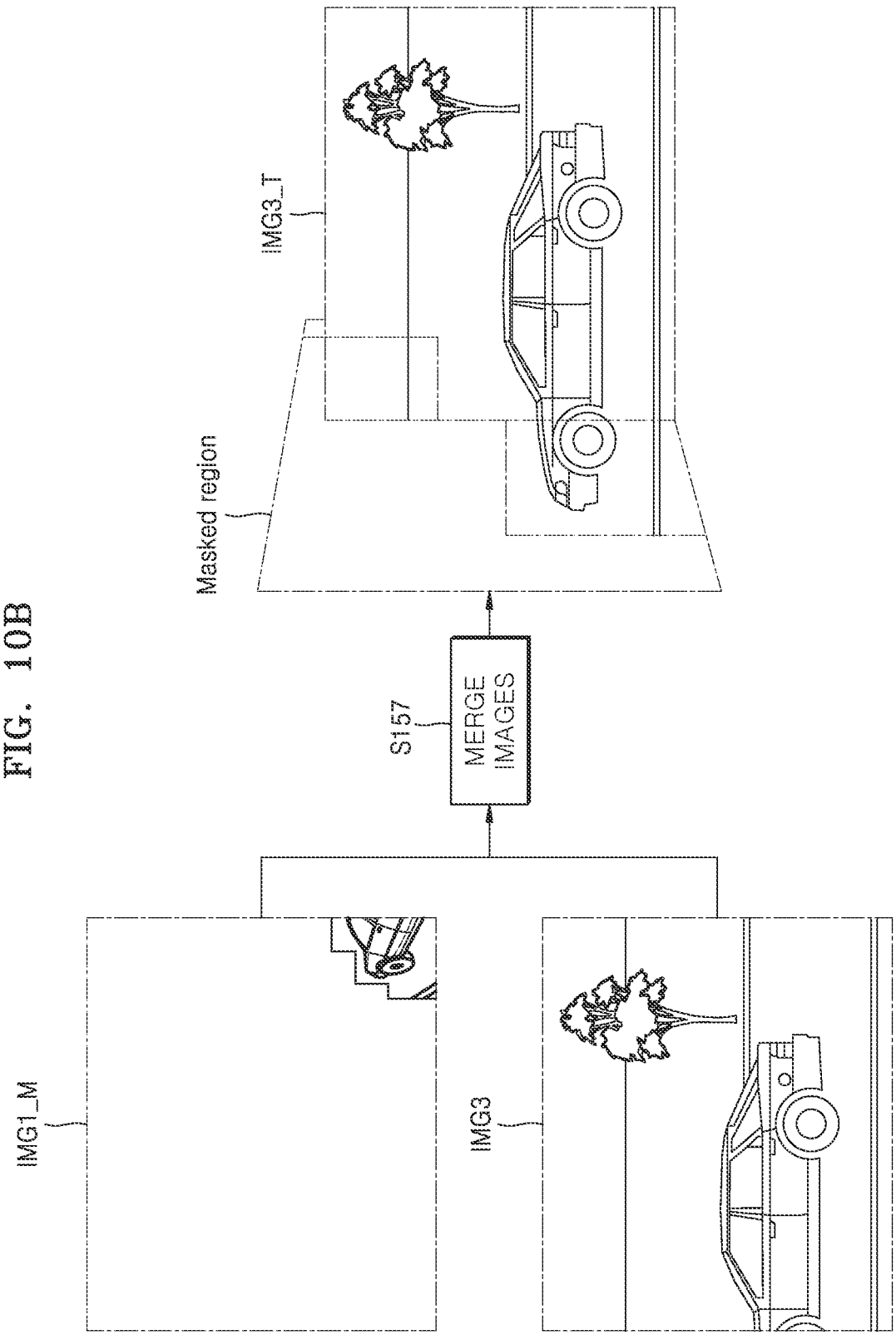

FIGS. 10A and 10B are diagrams of the image transformation method of FIG. 9.

Referring to FIGS. 1, 9 and 10A, the electronic device 10 may detect the target disparity values Info_D(Target), which are equal to or greater than the threshold value, from the disparity information Info_D. The electronic device 10 may generate a masked first image IMG1_M by masking the first image IMG1 based on the first image IMG1 and the detected target disparity values Info_D(Target) in operation S155. In detail, the electronic device 10 may detect the target area corresponding to the target disparity values Info_D(Target) from the first image IMG1 and may mask other areas of the first image IMG1 than the target area.

Referring to FIGS. 1, 9, and 10B, the electronic device 10 may generate the transformed third image IMG3_T by merging the masked first image IMG1_M with the third image IMG3 in operation S157. In this case, according to an embodiment, the electronic device 10 may merge the disparity values corresponding to the masked first image IMG1_M with the third image IMG3. A method of merging the disparity values with the third image IMG3 may be substantially the same as the above-described method of FIG. 7, and thus, descriptions thereof will be omitted. The electronic device 10 may not perform the object detection on the masked area when the object detection is performed on the transformed third image IMG3_T.

Referring to FIGS. 10A and 10B, the first image IMG1 is used, but one or more embodiments are not limited thereto. The second image IMG2 may be used.

Figure 11:
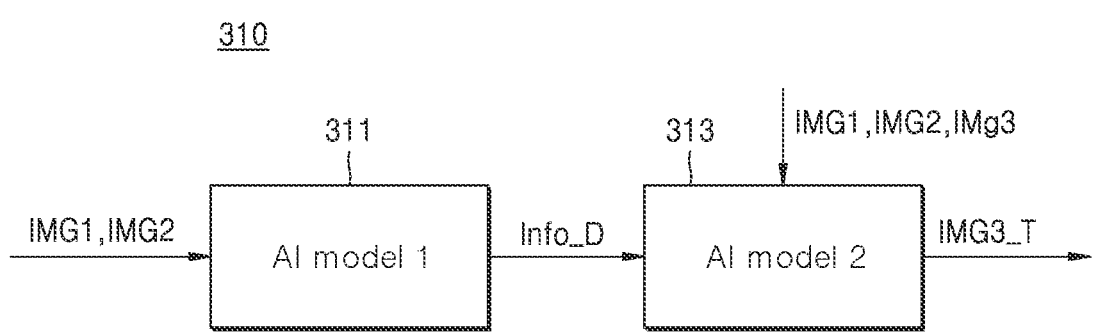
FIG. 11 is a block diagram of an image transformation module according to an embodiment.

FIG. 11 is a block diagram of the image transformation module 310 according to an embodiment. In detail, FIG. 11 is a diagram of a modifiable embodiment of the image transformation module 310 of FIG. 1.

Referring to FIG. 11, the image transformation module 310 may include a first artificial intelligence (AI) model 311 and a second AI model 313. The first AI model 311 may be an AI model that is trained to receive images and generate disparity information regarding the images based on the received images. The second AI model 313 may be an AI model that is trained to receive disparity information and images and generate images transformed based on the received disparity information and images.

In an embodiment, the first AI model 311 may receive the first image IMG1 and the second image IMG2 and generate the disparity information Info_D based on the received first and second images IMG1 and IMG2. For example, the first AI model 311 may receive the first image IMG1 and the second image IMG2 from the first image sensor 110 (of FIG. 1) and the second image sensor 120 (of FIG. 1) and may generate the disparity information Info_D regarding the received first and second images IMG1 and IMG2.

The second AI model 313 may receive the disparity information Info_D and the first to third images IMG1 to IMG3 and may transform the third image IMG3 based on the received disparity information Info_D and the received first and second images IMG1 and IMG2. For example, the second AI model 313 may receive the first to third images IMG1 to IMG3 from the first to third image sensors 110 to 130 (of FIG. 1), receive the disparity information Info_D from the first AI model 311, transform the third image IMG3 based on the first and second images IMG1 and IMG2, and output the transformed third image IMG3_T.

The second AI model 313 may generate the transformed third image IMG3_T by merging, with the third image IMG3, pixel values of some areas of at least one of the first image IMG1 and the second image IMG2. Alternatively, according to an embodiment, the second AI model 313 may generate the transformed third image IMG3_T by merging, with the third image IMG3, the pixel values of areas of at least one of the first image IMG1 and the second image IMG2 and disparity values corresponding to the areas. A method of merging the disparity values with the third image IMG3 may be substantially the same as the above-described method of FIG. 7, and thus, descriptions thereof may be omitted.

According to an embodiment, the second AI model 313 may receive at least one of the first image IMG1 and the second image IMG2. For example, the second AI model 313 may receive the first image IMG1, the third image IMG3, and the disparity information Info_D, transform the third image IMG3 based on the first image IMG1 and the disparity information Info_D, and output the transformed third image IMG3_T. As another example, the second AI model 313 may receive the second image IMG2, the third image IMG3, and the disparity information Info_D, transform the third image IMG3 based on the second image IMG2 and the disparity information Info_D, and output the transformed third image IMG3_T.

The first AI model 311 and the second AI model 313 may respectively perform neural network-based neural tasks based on various neural networks. A neural network may be a model based on at least one of various neural networks such as an Artificial Neural Network (ANN) model, a Multi-Layer Perceptrons (MLP) model, a Convolutional Neural Network (CNN) model, a Decision Tree model, a Random Forest model, an AdaBoost model, a Multiple Regression Analysis model, a Logistic Regression model, and a RANdom SAmple Consensus (RANSAC) model. However, types of the neural network are not limited thereto. Also, a neural network for performing one task may include sub-neural networks, and the sub-neural networks may be realized as heterogeneous or homogeneous neural network models.

The first AI model 311 or the second AI model 313 may each be realized as software, hardware, or a combination thereof. Each of the first AI model 311 and the second AI model 313 may be trained by a manufacturer in advance and may be included in the electronic device 10 during the manufacture. However, one or more embodiments are not limited thereto, and the processor 300 may train the first AI model 311 and/or the second AI model 313.

FIG. 11 illustrates that the image transformation module 310 includes the first AI model 311 and the second AI model 313, but one or more embodiments are not limited thereto. For example, the image transformation module 310 may include either the first AI model 311 or the second AI model 313.

Figure 12:
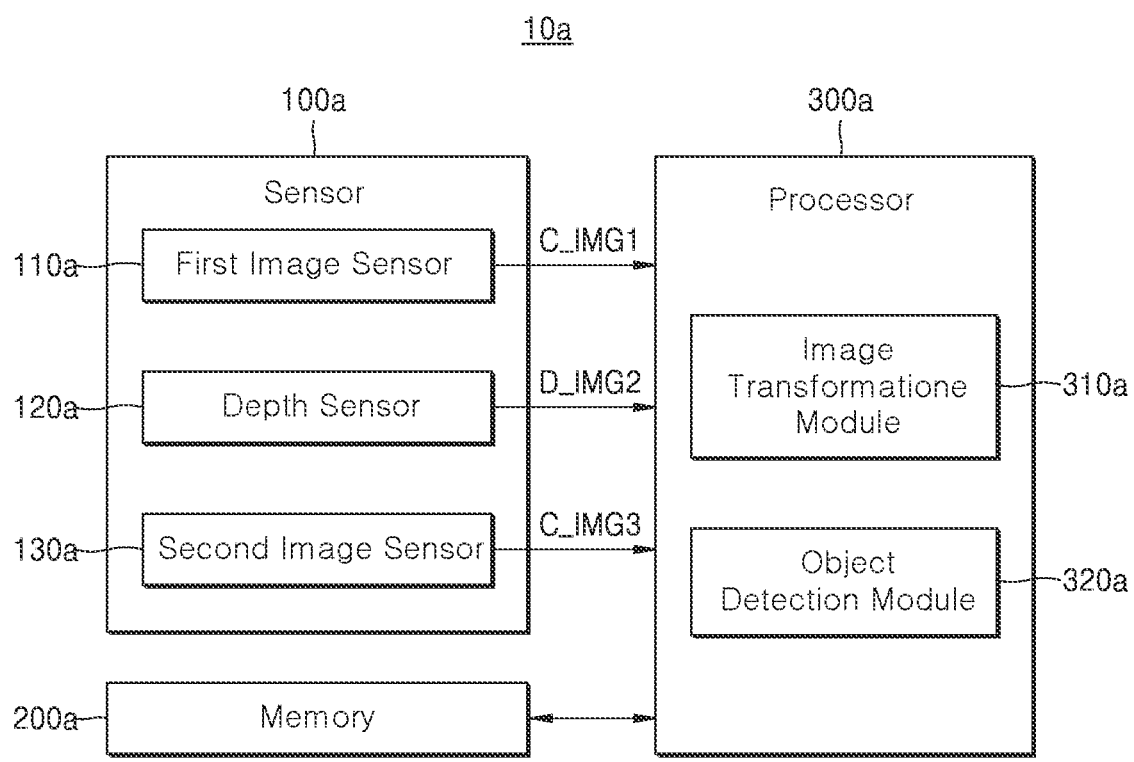
FIG. 12 is a block diagram of an electronic device according to an embodiment.

FIG. 12 is a block diagram of an electronic device 10a according to an embodiment. In detail, FIG. 12 is a diagram of a modifiable embodiment of the electronic device 10 of FIG. 1.

Referring to FIG. 12, the electronic device 10a may include a sensor 100a, a memory 200a, and a processor 300a. The sensor 100a may include a first image sensor 110a and a depth sensor 120a instead of the first image sensor 110 and the second image sensor 120 of FIG. 1. The first image sensor 110a may output a first color image C_IMG1 captured in a first direction. The depth sensor 120a may face in the first direction and output a depth image D_IMG2 corresponding to the first color image C_IMG1. The depth sensor 120a may measure a distance value of an object by measuring a delay time, which is taken when pulse light from a light source is reflected from an object, and measuring a distance to the object. For example, the depth sensor 120a may include an IR sensor.

The sensor 100a may include a second image sensor 130a corresponding to the third image sensor 130 of FIG. 1. In an embodiment, the second image sensor 130a may capture images in a direction perpendicular to a photographing direction of the first image sensor 110a and may output a second color image C_IMG3. For example, when the first image sensor 110a photographs a front view of the host vehicle, the second image sensor 120a may photograph the side view of the host vehicle. A second photographing area of the second image sensor 120a may overlap a first photographing area of the first image sensor 110a.

The processor 300a may transform the second color image C_IMG3 based on the first color image C_IMG1 and the depth image D_IMG2 by using an image transformation module 310a and may perform the object detection on the second color image C_IMG3 that is transformed by using an object detection module 320a.

The image transformation module 310a according to an embodiment may extract a target area from the first color image C_IMG1 based on the depth image D_IMG2, instead of the disparity information of FIG. 1. Here, the term 'target area' denotes an area of the first color image C_IMG1 that may be merged with the second color image C_IMG3. In an embodiment, the image transformation module 310a may detect an area of the depth image D_IMG2, which has a depth value that is equal to or greater than a threshold value, and may extract, as the target area, an area of the first color image C_IMG1 that corresponds to the detected area. In another embodiment, the image transformation module 310a may extract an area of the first color image C_IMG1, which overlaps the second photographing area of the second image sensor 130a, as the target area.

The image transformation module 310a may transform the second color image C_IMG3 by merging the extracted target area with the second color image C_IMG3.

In an embodiment, the electronic device 10 may include mapping information including a coordinate value of the second color image C_IMG3 that corresponds to each coordinate value of the first color image C_IMG1. The image transformation module 310a may detect the corresponding coordinate value of the second color image C_IMG3 with regard to each pixel forming the target area, based on the mapping information. The image transformation module 310a may merge a pixel value of each pixel forming the target area with the detected coordinate value of the second color image C_IMG3.

In another embodiment, for quicker calculation, the image transformation module 310a may only detect a coordinate value of the second color image C_IMG3 that corresponds to each feature point included in the target area, instead of each pixel forming the target area. The image transformation module 310a may merge an image having a preset size and including each feature point (e.g., a portion of the target area) with the detected coordinate value of the second color image C_IMG3. The object detection module 320a may perform object detection based on pixel values of the second color image C_IMG3 that is transformed.

When merging the target area with the second color image C_IMG3, the image transformation module 310a may merge, with the second color image C_IMG3, the pixel values of the target area and depth values of the depth image D_IMG2 that correspond to the target area. For example, the image transformation module 310a may merge the depth values corresponding to the target area with the second color image C_IMG3. As another example, the image transformation module 310a may generate distance information indicating a distance to the host vehicle based on the depth values and may merge the generated distance information with the second color image C_IMG3. A method whereby the image transformation module 310a merges the depth values with the second color image C_IMG3 is not limited thereto. The object detection module 320a may perform the object detection based on the pixel values and the depth values (or the distance information) of the second color image C_IMG3 that is transformed.

FIG. 12 illustrates that the electronic device 10a includes the first and second image sensors 110a and 130a and the depth sensor 120a. However, according to an embodiment, the electronic device 10a may not include the first and second image sensors 110a and 130a and the depth sensor 120a or may include at least some of them and receive images from an external device.

FIG. 12 illustrates that the first image sensor 110a and the second image sensor 130a output color images, but according to an embodiment, the first image sensor 110a and the second image sensor 130a may output black and white images.

FIG. 12 illustrates that the electronic device 10a includes the memory 200a, but according to an embodiment, the electronic device 10a may be separated from the memory 200a.

The electronic device 10a according to an embodiment may detect an area indicating a proximity object by using a color image captured in one direction and a depth image corresponding to the color image, merge an image, which is captured in another direction and includes other portions of the proximity object, with the detected area, and perform object detection on the merged image, thereby accurately detecting the proximity object.

Referring to FIG. 12, the electronic device 10a uses the depth sensor 120a, but according to an embodiment, a Light Detection and Ranging (LiDAR) sensor or a Radio Detection And Ranging (Radar) sensor may be used instead of the depth sensor 120a.

Figure 13:
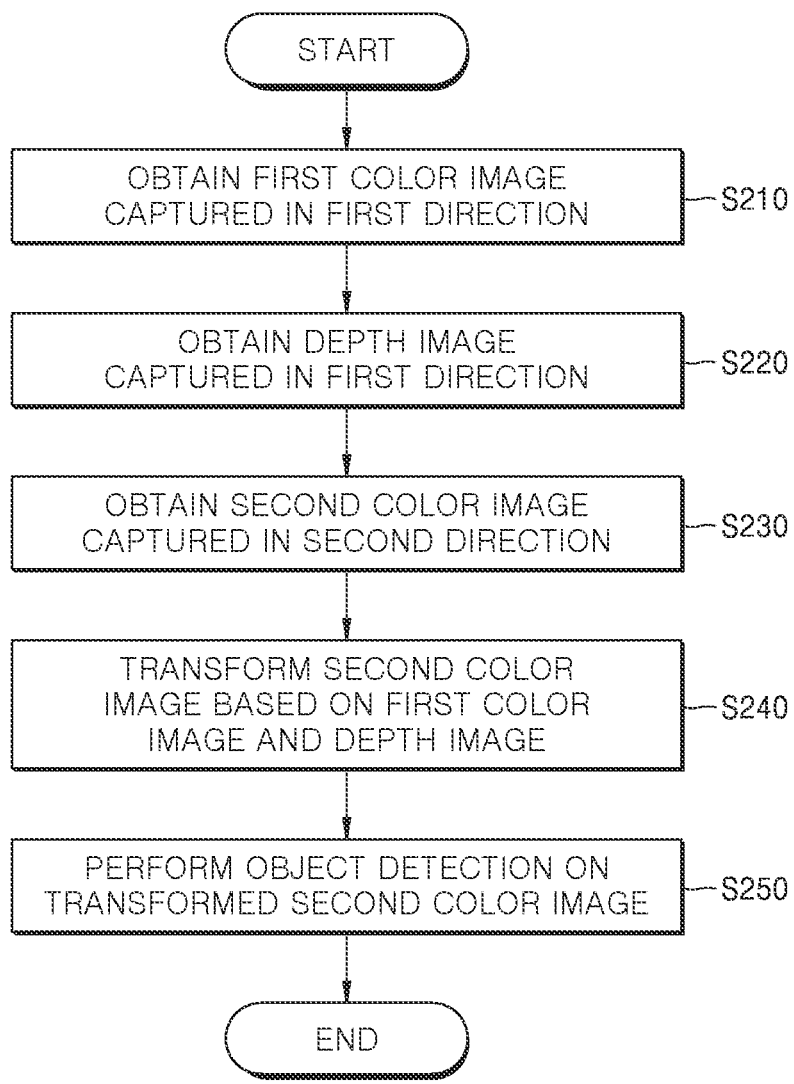
FIG. 13 is a flowchart of an operation method of an electronic device, according to an embodiment.

FIG. 13 is a flowchart of an operation method of the electronic device 10a according to an embodiment. In detail, FIG. 13 is a flowchart of the operation method of the electronic device 10a of FIG. 12. At least some of operations of FIG. 13 may be performed by the processor 300a of the electronic device 10a.

Referring to FIGS. 12 and 13, in operation S210, the electronic device 10a may obtain the first color image C_IMG1 captured in the first direction. In detail, the electronic device 10a may obtain the first color image C_IMG1 captured in the first direction by using the first image sensor 110a. However, one or more embodiments are not limited thereto, and the electronic device 10a may obtain the first color image C_IMG1 from the external device.

In operation S220, the electronic device 10a may obtain the depth image D_IMG2 captured in the first direction. In detail, the electronic device 10a may obtain the depth image D_IMG2 captured in the first direction by using the depth sensor 120a. However, one or more embodiments are not limited thereto, and the electronic device 10a may obtain the depth image D_IMG2 from the external device.

In operation S230, the electronic device 10a may obtain the second color image C_IMG3 captured in a second direction. In detail, the electronic device 10a may obtain the second color image C_IMG3 captured in the second direction by using the second image sensor 130a. However, one or more embodiments are not limited thereto, and the electronic device 10a may obtain the second color image C_IMG3 from the external device.

In operation S240, the electronic device 10a may transform the second color image C_IMG3 based on the first color image C_IMG1 and the depth image D_IMG2. In detail, the electronic device 10a may detect an area of the first color image C_IMG1, which indicates the proximity object close to the electronic device 10a, based on the depth image D_IMG2 and may transform the second color image C_IMG3 by merging the detected area with the second color image C_IMG3. In operation S250, the electronic device 10a may perform the object detection on the second color image C_IMG3.

Figure 14:
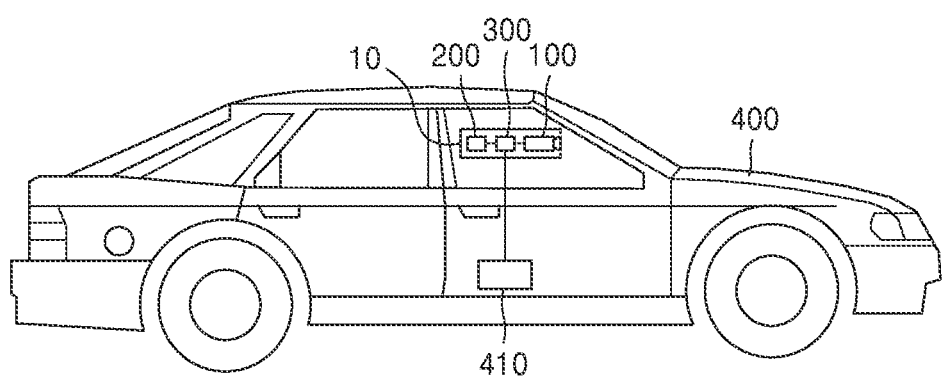
FIG. 14 is a diagram of a host vehicle including an electronic device, according to an embodiment.

FIG. 14 is a diagram of a host vehicle 400 including the electronic device 10, according to an embodiment. In detail, FIG. 14 is a diagram of an example of the host vehicle 400 including the electronic device of FIG. 1.

Referring to FIGS. 1 and 14, the host vehicle 400 may include the electronic device 10 and a vehicle controller 410. The electronic device 10 may be disposed on the host vehicle 400, and the sensor 100 may photograph the front and side surfaces of the host vehicle 400. A photographing direction of the sensor 100 is not limited thereto, and according to an embodiment, the sensor 100 may photograph the rear and the side surfaces of the host vehicle 400.

The vehicle controller 410 may control driving of the host vehicle 400 overall. The vehicle controller 410 may determine situations around the host vehicle 400 and control a navigation direction, speed, or the like of the host vehicle 400 according to a determination result. In an embodiment, the vehicle controller 410 may receive an object detection result of the electronic device 10, determine the situations around the host vehicle 400 according to the received object detection result, and transmit a control signal to a driver (not shown) of the host vehicle 400 according to a determination result, thereby controlling the navigation direction, speed, or the like of the host vehicle 400.

Referring to FIG. 14, the vehicle controller 410 is separated from the electronic device 10. However, according to an embodiment, the electronic device 10 may include the vehicle controller 410 or the processor 300 of the electronic device 10 and the vehicle controller 410 may be integrally formed. Additionally, the electronic device may include the memory 200 illustrated by FIG. 1.

FIG. 14 illustrates that the host vehicle 400 includes the electronic device 10 of FIG. 1, but according to an embodiment, the host vehicle 400 may include the electronic device 10a of FIG. 12.

Figure 15:
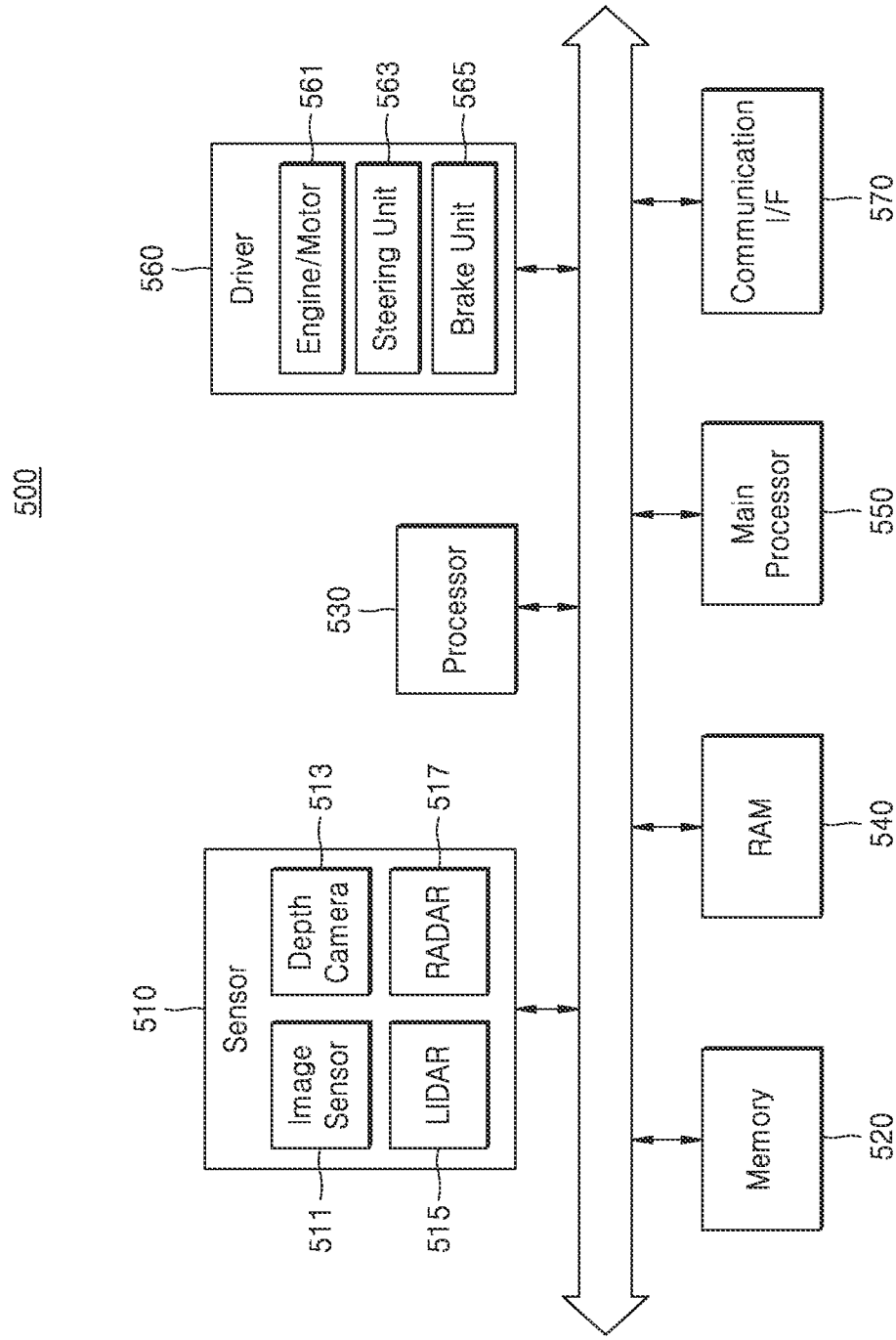
FIG. 15 is a block diagram of a self-driving device according to an embodiment.

FIG. 15 is a block diagram of a self-driving device 500 according to an embodiment.

Referring to FIG. 15, the self-driving device 500 may include a sensor 510, a memory 520, a processor 530, RAM 540, a main processor 550, a driver 560, and a communication interface 570 and the above-listed components of the self-driving device 500 may be interconnected to each other via a bus. The self-driving device 500 may perform situation determination, navigation control, and the like by analyzing, in real time, data of a surrounding environment of an autonomous host vehicle based on neural networks.

The sensor 510 may include multiple sensors for generating information regarding a surrounding environment of the self-driving device 500. For example, the sensor 510 may include sensors that receive image signals regarding the surrounding environment of the self-driving device 500 and output the received image signals into images. The sensor 510 may include an image sensor 511 such as a Charge Coupled Device (CCD) or a Complementary Metal Oxide Semiconductor (CMOS), a depth camera 513, a LiDAR sensor 515, a Radar sensor 517, and the like.

In this case, the image sensor 511 included in the sensor 510 may include multiple image sensors 511. The image sensors 511 may correspond to the first image sensor 110, the second image sensor 120, and the third image sensor 130 of FIG. 1. Alternatively, the image sensors 511 may correspond to the first image sensor 110a and the second image sensor 130a of FIG. 12. The depth camera 513 of the sensor 510 may correspond to the depth sensor 120a of FIG. 12.

The memory 520 may correspond to the memories 200 and 200a according to the one or more embodiments, and the processor 530 may correspond to the processors 300 and 300a according to the one or more embodiments. Also, the main processor 550 may correspond to the vehicle controller 410 of FIG. 14. In some embodiments, the image sensor 511, the memory 520, and the processor 530 may be realized according to the one or more embodiments described with reference to FIGS. 1 to 15.

The main processor 550 may control the operation of the self-driving device 500 overall. For example, the main processor 550 may control a function of the processor 530 by executing programs stored in the RAM 540. The RAM 540 may temporarily store programs, data, applications, or instructions.

The main processor 550 may control the operation of the self-driving device 500 according to an operation result of the processor 530. In an embodiment, the main processor 550 may receive an object detection result from the processor 530 and control operation of the driver 560 based on the received object detection result.

As components for driving the self-driving device 500, the driver 560 may include an engine/motor 561, a steering unit 563, and a brake unit 565. In an embodiment, the driver 560 may adjust acceleration, brakes, speed, directions, and the like of the self-driving device 500 by using the engine/motor 561, the steering unit 563, and the brake unit 565 according to the control of the processor 530.

The communication interface 570 may communicate with an external device in a wired or wireless communication manner. For example, the communication interface 570 may perform communication in a wired communication manner such as Ethernet or in a wireless manner such as Wi-Fi or Bluetooth.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. An electronic device comprising:
   a first image sensor configured to output a first image produced by photographing a first photographing area;
   a second image sensor configured to output a second image produced by photographing a second photographing area that overlaps the first photographing area;
   a third image sensor configured to output a third image produced by photographing a third photographing area; and
   a processor configured to perform object detection on an object included in an image, wherein the processor is configured to:
   generate disparity information indicating a separation degree of a feature point of the first image and the second image,
   extract, based on the disparity information, a target area from the first image or the second image,
   transform the third image by merging the target area with the third image, and
   perform the object detection on the transformed third image.

2. The electronic device of claim 1, wherein:
   the third photographing area of the third image sensor overlaps the first photographing area or the second photographing area, and
   the processor is configured to detect an area of the first image or the second image that overlaps the third photographing area and extract the target area from the area based on the disparity information.

3. The electronic device of claim 1, wherein the processor is configured to extract an area of the first image or the second image, which has a disparity value that is equal to or greater than a threshold value, as the target area based on the disparity information.

4. The electronic device of claim 1, further comprising:
   a memory that stores, for each coordinate value of the first image or the second image, mapping information of a coordinate value of the third image, wherein
   the processor is configured to detect a first location, where the target area is merged with the third image, based on the mapping information and merge the target area with the third image according to the first location.

5. The electronic device of claim 4, wherein the processor is configured to:
   detect a first feature point included in the target area,
   detect a second location where the first feature point is merged with the third image, and
   merge an area having a preset size and comprising the first feature point with the third image according to the second location.

6. The electronic device of claim 1, wherein the processor is configured to merge, with the third image, a plurality of pixel values forming the target area and a plurality of disparity values corresponding to the target area.

7. The electronic device of claim 6, wherein the processor is configured to perform the object detection based on the plurality of pixel values, which form the third image that is transformed, and the plurality of disparity values.

8. The electronic device of claim 1, wherein the processor is configured to:
   detect a third feature point included in the first image and a fourth feature point included in the second image,
   perform feature matching of the third feature point and the fourth feature point, and
   generate the disparity information based on a result of the feature matching.

9. The electronic device of claim 1, further comprising a stereo camera comprising the first image sensor and the second image sensor.

10. An electronic device comprising:
    a first image sensor configured to output a first color image captured in a first direction;
    a depth sensor configured to output a depth image corresponding to the first color image;
    a second image sensor configured to output a second color image captured in a second direction; and
    a processor configured to perform object detection on an object included in an image, wherein the processor is configured to:
    extract, based on the depth image, a target area from the first color image,
    transform the second color image by merging the target area with the second color image, and
    perform the object detection on the second color image that is transformed.

11. The electronic device of claim 10, wherein the processor is configured to extract the target area from the first color image, which has a depth value that is equal to or greater than a threshold value, as the target area based on the depth image.

12. An operation method of an electronic device, the operation method comprising:
    obtaining a first image produced by photographing a first photographing area;
    obtaining a second image produced by photographing a second photographing area that overlaps the first photographing area;
    obtaining a third image produced by photographing a third photographing area;

generating disparity information indicating a separation degree of a feature point of the first image and the second image;

extracting, based on the disparity information, a target area from the first image or the second image;

transforming the third image by merging the target area with the third image; and performing object detection on the third image that is transformed.

13. The operation method of claim 12, wherein:

the third photographing area overlaps the first photographing area or the second photographing area, and the extracting of the target area from the first image or the second image based on the disparity information comprises:

detecting an area of the first image or the second image that overlaps the third photographing area; and extracting the target area from the area that overlaps the third photographing area.

14. The operation method of claim 12, wherein the extracting of the target area comprises extracting an area of the first image or the second image, which has a disparity value that is equal to or greater than a threshold value, as the target area based on the disparity information.

15. The operation method of claim 12, wherein the merging of the target area with the third image comprises:

detecting a first location, where the target area is merged with the third image, based on mapping information regarding a coordinate value of the third image that corresponds to each coordinate value of the first image or the second image; and merging the target area with the third image according to the first location.

16. The operation method of claim 15, wherein:

the detecting of the first location where the target area is merged with the third image comprises:

detecting a first feature point included in the target area; and detecting a second location where the first feature point is merged with the third image, based on the mapping information, and the merging of the target area with the third image according to the second location comprises merging, with the third image, an area comprising the first feature point and having a preset size, according to the second location.

17. The operation method of claim 12, wherein the merging of the third image based on the disparity information comprises transforming the third image by merging, with the third image, a plurality of pixel values forming the target area and a plurality of disparity values corresponding to the target area.

18. The operation method of claim 17, wherein the performing of the object detection on the third image that is transformed comprises performing the object detection based on the plurality of pixel values forming the third image, which is transformed, and the plurality of disparity values that are merged.

* * * * *